(12) United States Patent
Okamoto et al.

(10) Patent No.: US 6,750,428 B2
(45) Date of Patent: Jun. 15, 2004

(54) AUTOMATIC WELDING DEVICE AND WELDING SKILL TRAINING DEVICE

(75) Inventors: Takeshi Okamoto, Kitakyushu (JP); Shinji Okumura, Kitakyushu (JP); Hiroyuki Handa, Kiatkyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 71 days.

(21) Appl. No.: 10/148,213

(22) PCT Filed: Dec. 11, 2000

(86) PCT No.: PCT/JP00/08757

§ 371 (c)(1),
(2), (4) Date: Oct. 3, 2002

(87) PCT Pub. No.: WO01/41965

PCT Pub. Date: Jun. 14, 2001

(65) Prior Publication Data

US 2003/0075534 A1 Apr. 24, 2003

(30) Foreign Application Priority Data

Dec. 10, 1999 (JP) ............................................. 11-352402

(51) Int. Cl.$^7$ ............................................. B23K 9/095
(52) U.S. Cl. ............................... 219/130.5; 219/125.1; 901/42
(58) Field of Search ........................ 219/130.5, 124.34, 219/125.1, 130.01; 901/42

(56) References Cited

U.S. PATENT DOCUMENTS 6,096,994 A * 8/2000 Handa et al. ............ 219/130.5
6,133,545 A * 10/2000 Okazaki et al. .......... 219/130.5

FOREIGN PATENT DOCUMENTS

| JP | 3-27875 | 2/1991 |
| JP | 4-97383 | 3/1992 |
| JP | 6-126453 | 5/1994 |
| JP | 11-170048 | 6/1999 |

* cited by examiner

*Primary Examiner*—Clifford C. Shaw
(74) *Attorney, Agent, or Firm*—Westerman, Hattori, Daniels & Adrian, LLP

(57) ABSTRACT

A technique for judging a welding quality for acceptance or rejection and displaying the result in diagrams, and an automatic welding device incorporating the technique therein. When an operation result record status judging means judges that past operation records are available, temperature distribution operation result records at joints of works to be welded are displayed by a weld penetration display means (23) and bead surface shape operation result records are displayed by a bead surface shape display means (25), whereby time required for operation by a temperature distribution operation means and time required for operation by a bead surface shape operation means (24) are omitted by an operation time omitting means incorporated in the automatic welding device.

21 Claims, 21 Drawing Sheets

NOTES
A: Input the temperature distribution operation result
B: Temperature distribution result of the joint of the to-be-welded object
C: Input the operation result
D: Temperature distribution result of the joint of the to-be-welded object
E: Display the cross-section temperature distribution

NOTES

A: Input the temperature distribution result of the joint of the to-be-welded object B: Input the temperature distribution operation result of the joint of the to-be-welded object C: Input the temperature distribution result of the joint of the to-be-welded object that has been recorded NOTES
A: Input the to-be-welded object information
B: Input the welding conditions of the to-be-welded object
C: Temperature distribution operation result recording and surface shape operation result recording means
D: Input the temperature distribution operation result
E: Input the bead surface shape operation result
F: Recording and management

Fig.10

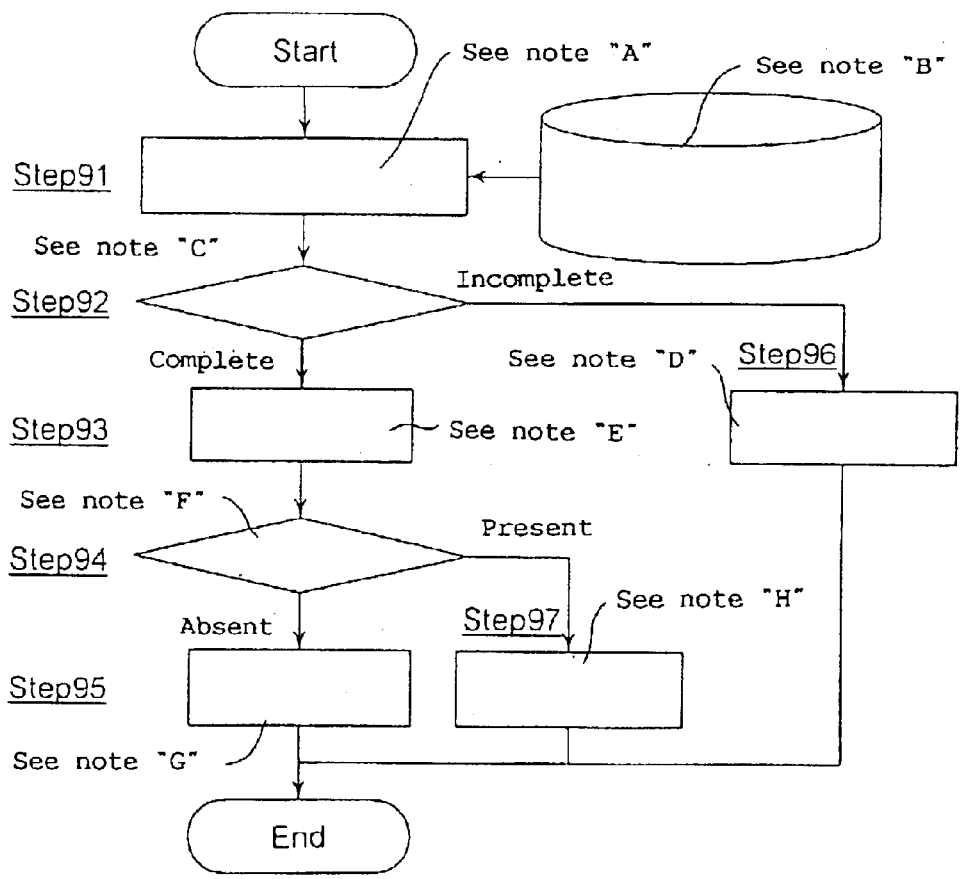

NOTES

A: Input the to-be-welded object information
B: Temperature distribution operation result recording and surface shape operation result recording means
C: Penetration judgment
D: Occurrence of incomplete penetration flag
E: Occurrence of penetration acceptance flag
F: Welding defect judgment
G: Occurrence of bead shape defective flag
H: Occurrence of joint quality acceptance flag NOTES
A: Input the joint quality acceptance flag
B: Welding conditions of the to-be-welded object
C: Start welding

NOTES

A: Input the penetration acceptance flag
B: Joint quality acceptance flag
C: Inquire the welding conditions to be changed
D: Retrieve the welding conditions
E: Give the welding conditions to be changed
F: Temperature distribution operation result recording and surface shape operation result recording means

NOTES

A: Welding condition setting means
B: Temperature distribution operation means
C: Welding-condition changing means
D: Bead shape operation means
E: Bead shape display means
F: Bead shape observation position setting means

NOTES

A: Calculate the thermal conduction
B: Calculate the bead shape
C: Change the display position settings
D: Display the bead shape operation result
E: Change the display position
F: Change the condition setting Step51 : Present the standard conditions Step61 : Calculate the thermal conduction Step62 : Temperature data in base material Step71 : Set the temperature distribution of the joint of the to-be-welded object Step72 : Calculate the bead shape Step73

AUTOMATIC WELDING DEVICE AND WELDING SKILL TRAINING DEVICE

TECHNICAL FIELD

This invention relates to a fully-automatic welding device, provided with a manipulator and a quality monitoring mechanism used to monitor the quality of a melted joint, for melting and joining metals together by a welding arc, and this invention relates to a welding skill training device capable of presenting a welding working condition and capable of displaying a welded-joint section operation result and a welded-joint surface operation result based on the welding working condition.

BACKGROUND ART

Conventionally, a finish-visual-evaluation system for a welded joint can be classified into three evaluation types, i.e., a pre-welding evaluation, an in-welding evaluation, and a post-welding evaluation from the temporal viewpoint of evaluation execution, and, when evaluated, the in-welding evaluation and the post-welding evaluation in each of which a real object to be welded is used have been employed in most cases.

With regard to the pre-welding evaluation, there is a method disclosed in Japanese Patent Publication No. Hei-7-47209 in which a plurality of welding parameters are stored, thereafter other welding parameters are sequentially determined according to a plurality of condition generating rules, and a welding condition, which is required when welding, is determined by repeating this, and a method disclosed in Japanese Unexamined Patent Publication No. Hei-5-57436 in which only welding conditions that correspond to predetermined conditions are stored in a database, a welding condition that agrees with a predetermined condition that has been input is thereafter retrieved from the database, and, if the welding condition is not contained in the database, the welding condition is inferred by the use of a welding-condition-data-inferring portion constructed by a neural network, and, if welding conditions are suitable, all welding conditions employed at that time are registered in the database.

However, the conventional finish-visual-evaluation system for a welded joint is at a disadvantage in the fact that the quality of a welded-joint appearance cannot be evaluated at any time since member generation occurs in a to-be-welded object because of the in-welding evaluation or the post-welding evaluation and since a welder who has considerable skills is required in the work schedule. Another disadvantage is the fact that a welding result cannot be represented in the form of a graphic figure even if a recommended welding condition is presented in the case of the pre-welding evaluation.

Additionally, in order to acquire arc-welding skills, a method of offering the skills from a skilled welder has been employed, and on-the-job training has been conducted in most cases.

However, the conventional method of acquiring arc-welding skills has a problem in that a recent decline in the number of skilled welders makes it difficult to offer welding skills to beginning welders who intend to newly master the skills.

DISCLOSURE OF INVENTION

A first object of the present invention is to solve the aforementioned problems by means of a technique for judging weld quality for acceptance or rejection by specifying welding conditions and material parameters before welding and displaying the result in diagrams and by means of a fully-automatic welding device incorporating the technique thereinto.

A second object of the present invention is to solve the aforementioned problems by means of a welding skill training device by which a beginning welder can confirm the predicted cross-sectional shape of a welded joint that depends on a welding condition any number of times and for which a technique for realizing training equal to an offer of skills from a skilled welder is incorporated.

In order to achieve the first object, the automatic welding device of the present invention has an optimal welding condition operation means for setting information regarding a to-be-welded object that includes board thickness, outer dimensions, and the joint shape of the to-be-welded object and performing arithmetical operations for welding conditions that include welding current, welding voltage, and welding speed suitable for information, whereby the present invention is characterized in that the automatic welding device includes a temperature distribution operation means for performing arithmetical operations for a temperature distribution in a joint of the to-be-welded object from the information regarding the to-be-welded object and from the welding conditions; a temperature distribution operation result recording means for recording at least information regarding the to-be-welded object, the welding conditions, and a temperature distribution operation result calculated by the temperature distribution operation means; a weld penetration display means for displaying at least a penetration width, a penetration depth, and a penetration shape based on the temperature distribution operation result; a bead surface shape operation means for performing arithmetical operations for a molten-metal bead surface shape from at least information regarding the to-be-welded object recorded in the temperature distribution operation result recording means, the welding conditions, and the temperature distribution operation result; a bead surface shape operation result recording means for recording a molten-metal bead surface shape operation result calculated by the bead surface shape operation means; a bead surface shape operation result display means for displaying the surface shape operation result calculated by the bead surface shape operation means by at least a cross-sectional view, a longitudinal sectional view, and a general view of the welded joint; a bead shape observation position setting means capable of setting a bead shape observation position by a viewing point from an arbitrary position in displaying the bead surface shape; an arbitrary position bead shape display means for displaying at least the general view of the welded joint from a position set by the bead shape observation position setting means; a joint quality acceptance/rejection judging means for judging acceptance or rejection of a joint quality of the to-be-welded object from a temperature distribution in the joint of the to-be-welded object in the temperature distribution operation result recording means; a weld starting means for automatically starting to weld the to-be-welded object under the welding conditions recorded in the temperature distribution operation result recording means when judgment of the acceptance of the joint quality is made in the joint quality acceptance/rejection judging means; a welding condition correction means for correcting the welding conditions of at least the welding current, the welding voltage, and the welding speed to satisfy acceptance criteria when judgment of the rejection of the joint quality is made in the joint quality acceptance/rejection judging means; an operation result record situation judging means for judging the presence or absence of similar information regarding the to-be-welded object, a similar temperature distribution operation result record, and a similar bead surface shape operation result record before setting the information regarding the to-be-welded object; and an operation time omitting means for omitting time required for operation by the temperature distribution operation means and time required for operation by the bead surface shape operation means by allowing the weld penetration display means to display a temperature distribution operation result record in the joint of the to-be-welded object and by allowing the bead surface shape display means to display a bead surface shape operation result record when the operation result record situation judging means judges that there is an arithmetical operation record in the past.

In order to achieve the second object, the welding skill training device of the present invention has a welding condition setting means for setting information regarding a to-be-welded object that includes board thickness, outer dimensions, and the joint shape of the to-be-welded object and presenting welding conditions that include welding current, welding voltage, welding speed, and torch angle suitable for information, whereby the present invention is characterized in that the welding skill training device includes a temperature distribution operation means for performing arithmetical operations on a temperature distribution in a joint of the to-be-welded object from information regarding the to-be-welded object and from the welding conditions; a bead surface shape operation means for performing arithmetical operations on a molten-metal bead surface shape from the information regarding the to-be-welded object, from the welding conditions, and from the temperature distribution operation result; a bead shape display means for displaying a welded-joint bead shape by a cross-sectional view, a longitudinal sectional view, and a general view from a surface shape operation result calculated by the surface shape operation means and a temperature distribution calculated by the temperature distribution operation means; a bead shape observation position setting means capable of setting a bead shape observation position by a viewing point from an arbitrary position in displaying the bead shape; and a welding-condition changing means for changing at least a penetration width, a penetration depth, and a penetration shape based on the temperature distribution operation result.

BRIEF DESCRIPTION OF DRAWINGS

FIG. 10 is a flowchart showing one example of a joint quality acceptance/rejection judging means.

BEST MODE FOR CARRYING OUT THE INVENTION

The present invention will be hereinafter described on the basis of embodiments shown in the figures.

Figure 1:
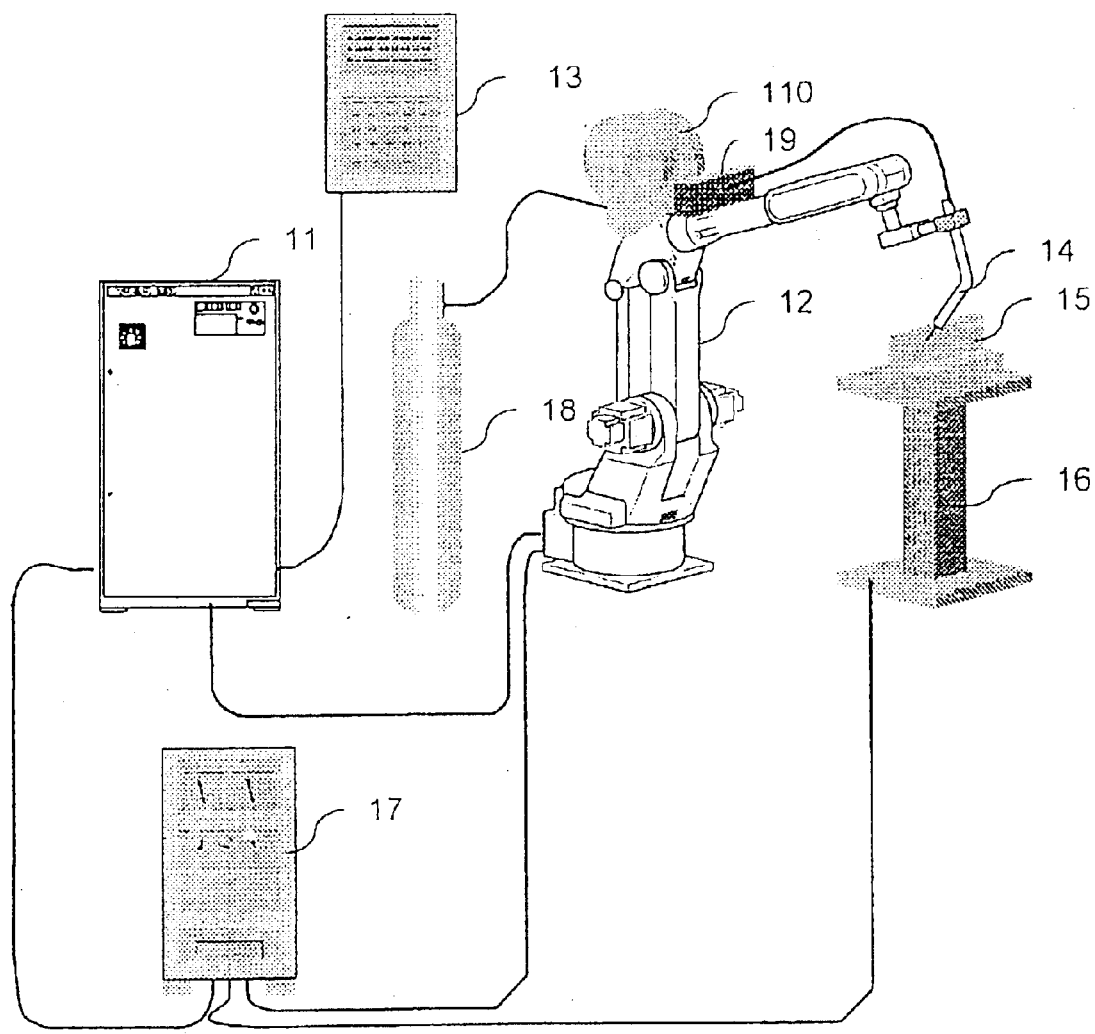
FIG. 1 is a general schematic drawing of a device that embodies the present invention.

FIG. 1 is a general schematic drawing of an embodiment of a device for achieving the first object of the present invention. 11 designates a robot controller for controlling a robot mechanism 12 and a welder 13. The robot controller 11 and the robot mechanism 12 are connected to each other by a cable for driving a motor, a cable for feeding back rotational information to the robot controller 11 by an encoder attached to the motor, etc. A 6-axis vertical articulated type manipulator is used in the robot mechanism 12. 13 designates a teaching pendant for teaching tasks to a robot and displaying various states, which can make a large-screen and multicolor display. 14 designates a welding torch, which has a hole through which a welding wire supplied from a welding wire container 110 by a wire feeder 19 smoothly passes and a passage for a shielding gas supplied from a shielding-gas cylinder 18 in its inside, and from the tip of which a shielding gas is emitted. A copper-made electric supply chip for supplying welding electric power from a welding source 17 to the welding wire is attached to the tip of the welding torch 14. 15 designates an object work, which is fixed by an object-work fixture 16 and the posture of which is changed thereby.

Figure 2:
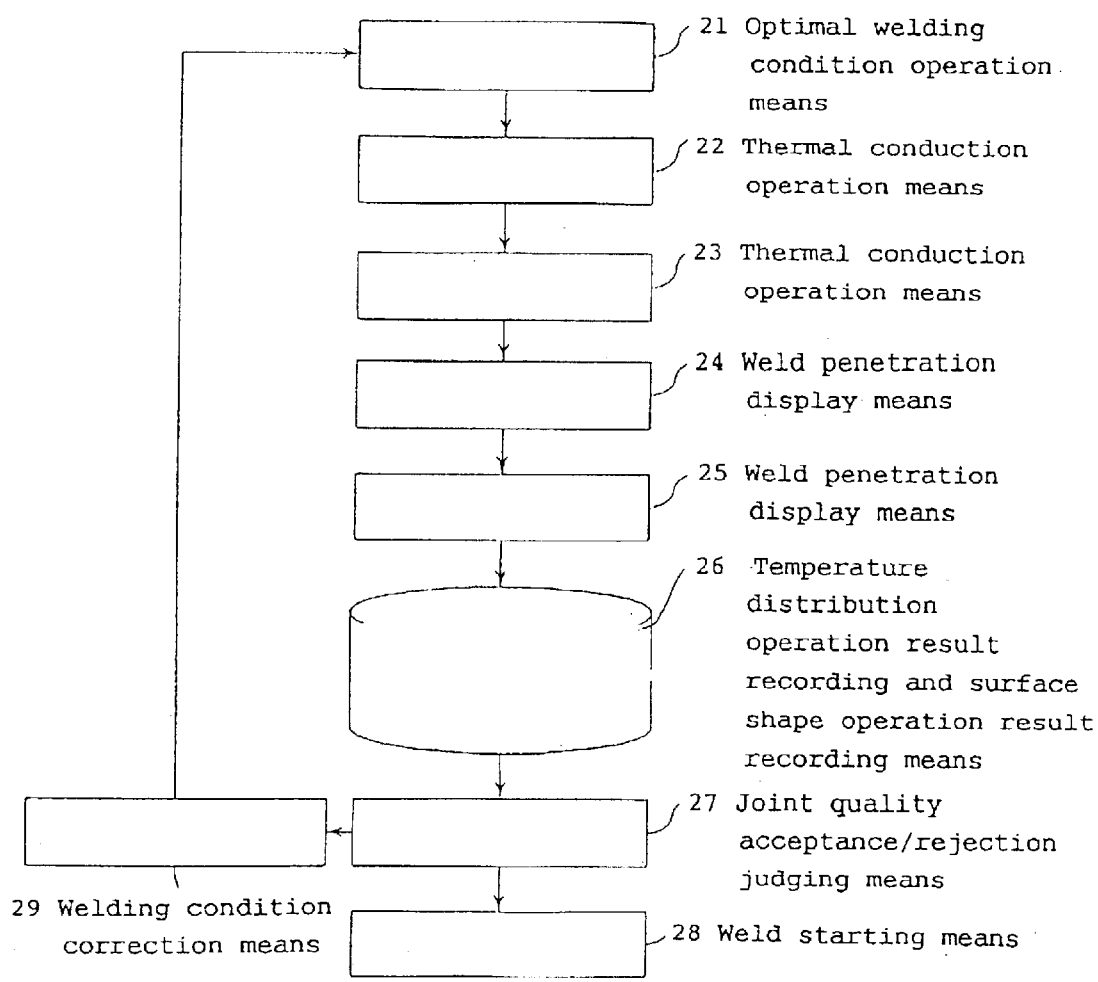
FIG. 2 is a block diagram that shows an information flow in an embodiment of the present invention.

FIG. 2 is a block diagram that shows an information flow in this embodiment. 21 designates an optimal welding condition operation means, which displays or inputs information and welding conditions through the teaching pendant 13 of FIG. 1.

22 designates a thermal conduction operation means, which outputs a temperature distribution operation result based on the information and the welding conditions of a to-be-welded object that have been input from the teaching pendant 13.

23 designates a weld penetration display means, which displays a penetration shape based on a temperature distribution operation result that has been output from the thermal conduction operation means 22.

24 designates a bead shape operation means, which outputs a bead shape operation result based on a temperature distribution operation result that has been output from the thermal conduction operation means 22.

25 designates a bead shape display means, which displays a bead surface shape operation result based on a bead surface shape operation result that has been output from the bead shape operation means 24 and based on a bead surface shape observation position that has been input from the teaching pendant 13.

26 designates a temperature distribution operation result recording means and a surface shape operation result recording means, which records a temperature distribution operation result that has been output from the thermal conduction operation means 22 and a bead surface shape operation result that has been output from the bead shape operation means 24.

27 designates a joint quality acceptance/rejection judging means, which inputs the temperature distribution operation result recording means 26 and outputs a joint quality acceptance/rejection judgment result.

28 designates a weld starting means, which starts to weld the object work 15 to be welded through the robot mechanism 12 under welding conditions recorded in the temperature distribution operation result recording means 26.

29 designates a welding condition correction means, which inputs conditions that have been obtained by correcting the welding conditions recorded in the temperature distribution operation result recording means 26 and in the joint quality acceptance/rejection judging means 27 into the optimal welding condition operation means 21.

Figure 3:
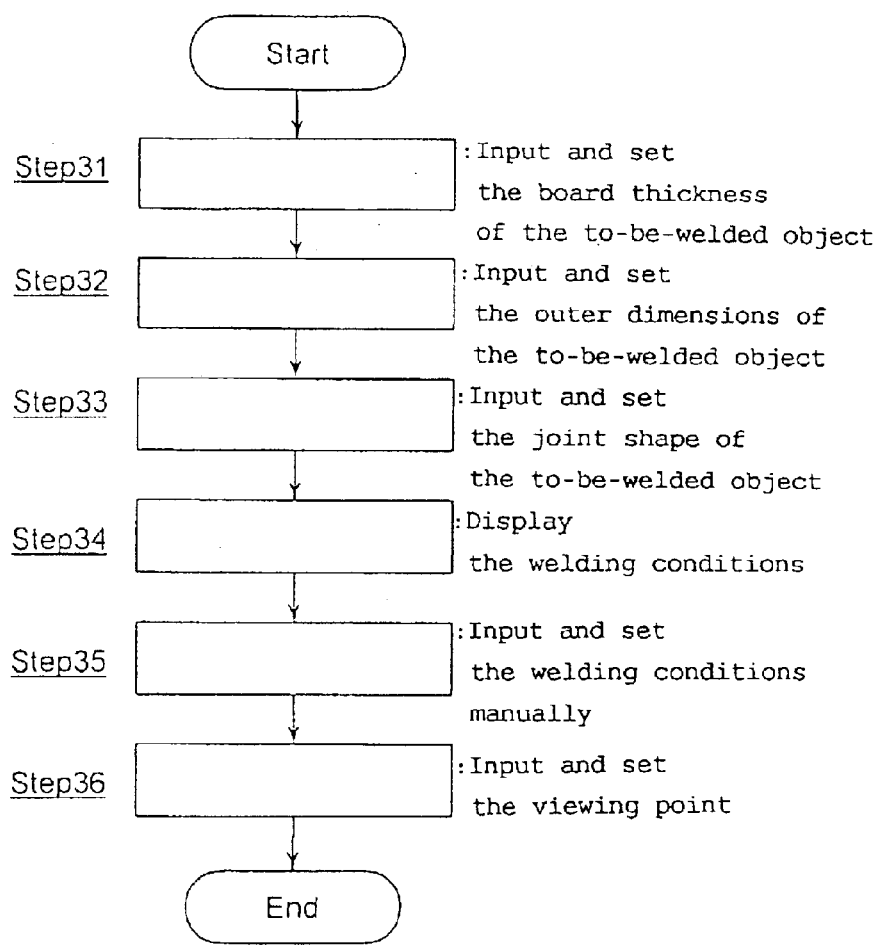
FIG. 3 is a flowchart showing one example of an optimal welding condition operation means.

FIG. 3 is a flowchart showing one example of the optimal welding condition operation means, which corresponds to the information flow of the optimal welding condition operation means 21, the thermal conduction operation means 22, the weld penetration display means 23, the bead shape display means 25, and the welding condition correction means 29 of FIG. 2. One example of optimum welding condition arithmetical operations will be described with reference to FIG. 3.

Step 31 A worker is required to select or input the board thickness of the to-be-welded object from the optimal welding condition operation means 21 and to set it.

Step 32 The worker is required to select or input the outer dimensions of the to-be-welded object from the optimal welding condition operation means 21 and to set it.

Step 33 The worker is required to select or input the joint shape of the to-be-welded object from the optimal welding condition operation means 21 and to set it.

Step 34 The optimal welding condition operation means 21 is caused to display acceptable welding conditions from information that has been set in Steps 31 to 33 and operation result information that has been recorded in the recording means 26.

Step 35 The worker is required to manually select or input a welding condition from the optimal welding condition operation means 21 and to set it when conditions excluding the welding conditions presented in Step 34 are employed.

Step 36 The worker is required to select or input the viewing point of a bead shape observation position in the bead shape display means 26 and to set it.

Figure 4:
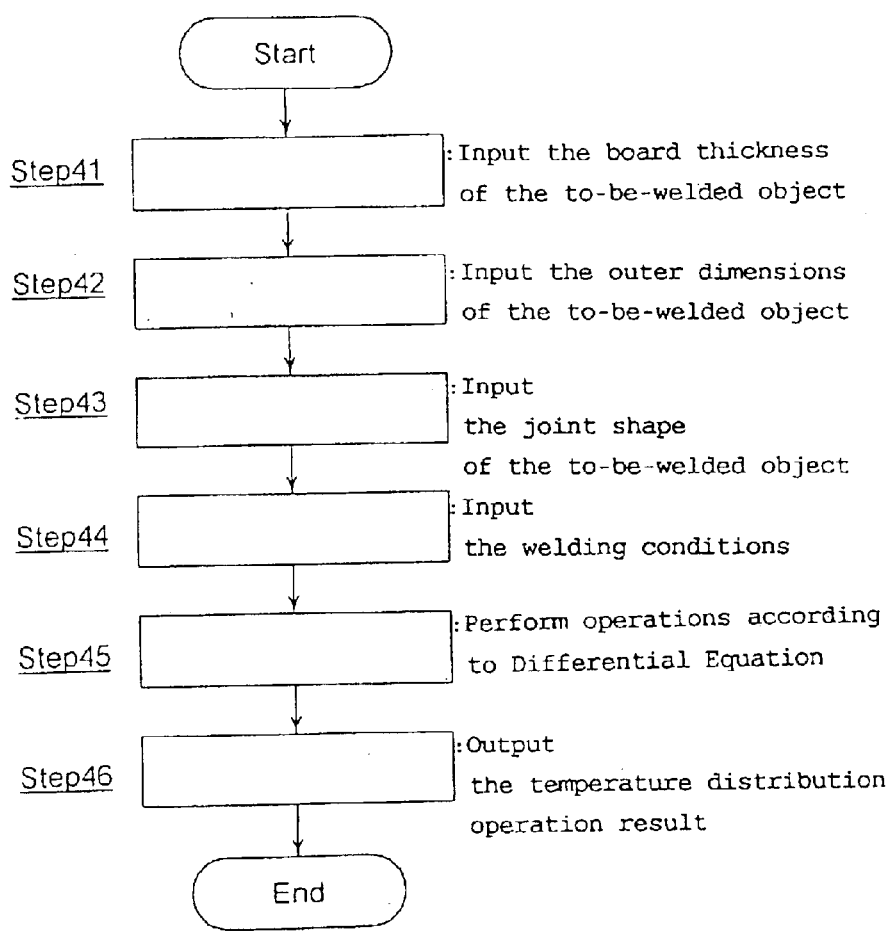
FIG. 4 is a flowchart showing one example of a thermal conduction operation means.

FIG. 4 is a flowchart showing one example of the thermal conduction operation means 22, which corresponds to the information flow of the display 23 of the thermal-conduction operation result and the bead shape operations 24 of FIG. 2. One example of the thermal-conduction operations will be described with reference to FIG. 4.

Step 41 The board thickness of the to-be-welded object set by the optimal welding condition operation means 21 is input.

Step 42 The outer dimensions of the to-be-welded object set by the optimal welding condition operation means 21 is input.

Step 43 The joint shape of the to-be-welded object set by the optimal welding condition operation means 21 is input.

Step 44 The welding condition of the to-be-welded object set by the optimal welding condition operation means 21 is input.

Step 45 Operations are performed according to Differential Equation 1 based on parameters that have been input in Steps 41 to 44.

$$k\left(\frac{\partial^2 T}{\partial \xi^2} + \frac{\partial^2 T}{\partial y^2} + \frac{\partial^2 T}{\partial z^2}\right) = -v\frac{\partial T}{\partial \xi} \qquad \text{Equation 1}$$

wherein k is thermal diffusivity (or temperature diffusivity) [$m^2/s$], T is temperature [k], and v is the traverse speed of a heat source [m/S].

Figure 7:
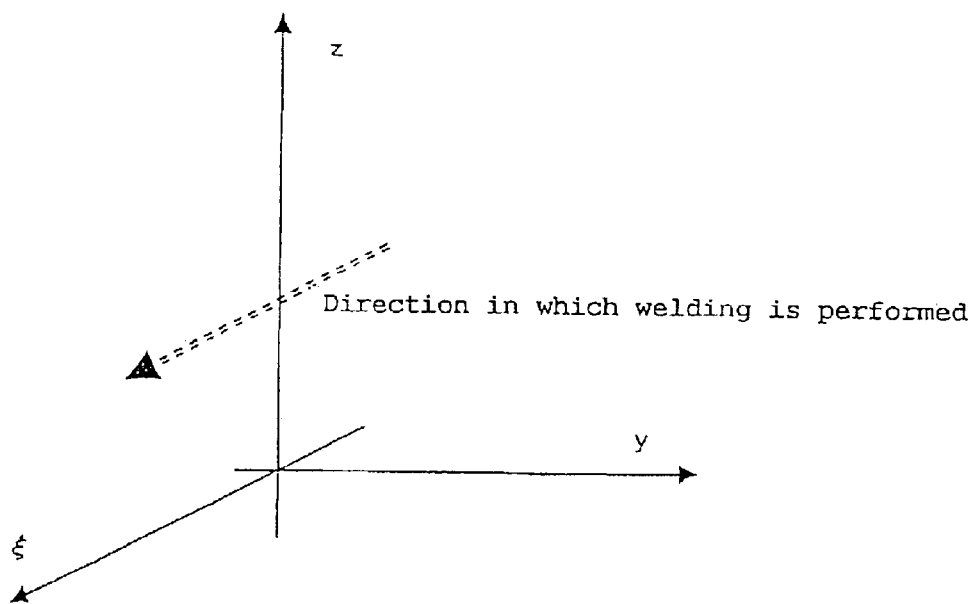
FIG. 7 is an explanatory diagram showing coordinate systems used for calculation in the present invention.

The coordinate system used for the arithmetical operations is shown in FIG. 7. ?, Y, and Z are coordinate axes perpendicular to one another, and a torch serving as a heat source moves on the ? axis.

Step 46 A temperature distribution operation result of the joint of the to-be-welded object is output, the output result is then displayed by the weld penetration display means 23, is then used by the bead shape operation means 24, and is recorded by the temperature distribution operation result recording means and the surface shape operation result recording means 26.

Figure 5:
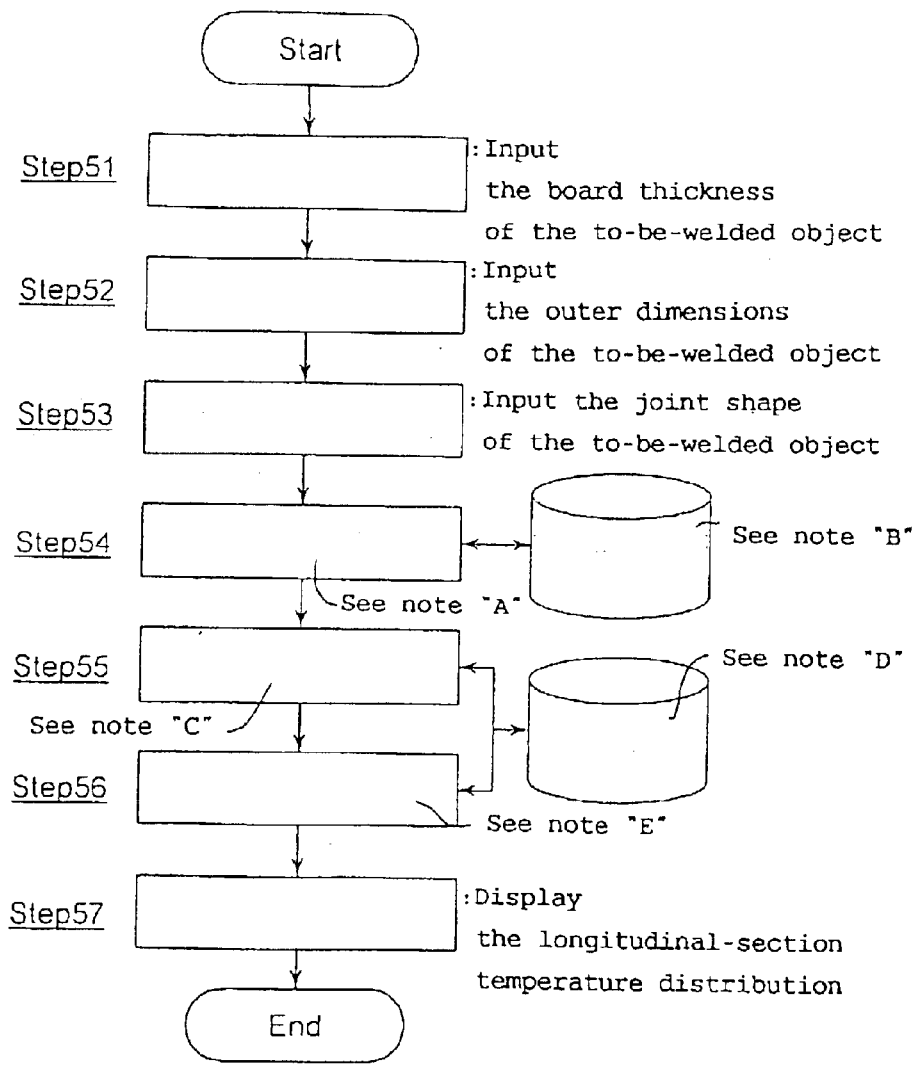
FIG. 5 is a flowchart showing one example of a weld penetration display means.

FIG. 5 is a flowchart showing one example of the weld penetration display means 23, and corresponding to the information flow of the thermal conduction operation means 22, the temperature distribution operation result recording means, and the surface shape operation result recording means 26.

Step 51 The board thickness of the to-be-welded object set by the optimal welding condition operation means 21 is input.

Step 52 The outer dimensions of the to-be-welded object set by the optimal welding condition operation means 21 is input.

Step 53 The joint shape of the to-be-welded object set by the optimal welding condition operation means 21 is input.

Step 54 The joint temperature distribution operation result of the to-be-welded object calculated by the thermal conduction operation means 22 is input.

Step 55 If an operation example exists in the past, the joint temperature distribution operation result of the to-be-welded object that is under the same condition and that has been recorded in the temperature distribution operation result recording means and in the surface shape operation result recording means 26 is input.

Step 56 A cross-section temperature distribution display is made based on the joint temperature distribution operation result of the to-be-welded object calculated by the thermal conduction operation means 22 or based on the joint temperature distribution operation result of the to-be-welded object that is under the same condition and that has been recorded in the operation result recording means 26.

Step 57 A longitudinal-section temperature distribution display is made based on the joint temperature distribution operation result of the to-be-welded object calculated by the thermal conduction operation means 22 or based on the joint temperature distribution operation result of the to-be-welded object that is under the same condition and that has been recorded in the operation result recording means 26.

Figure 6:
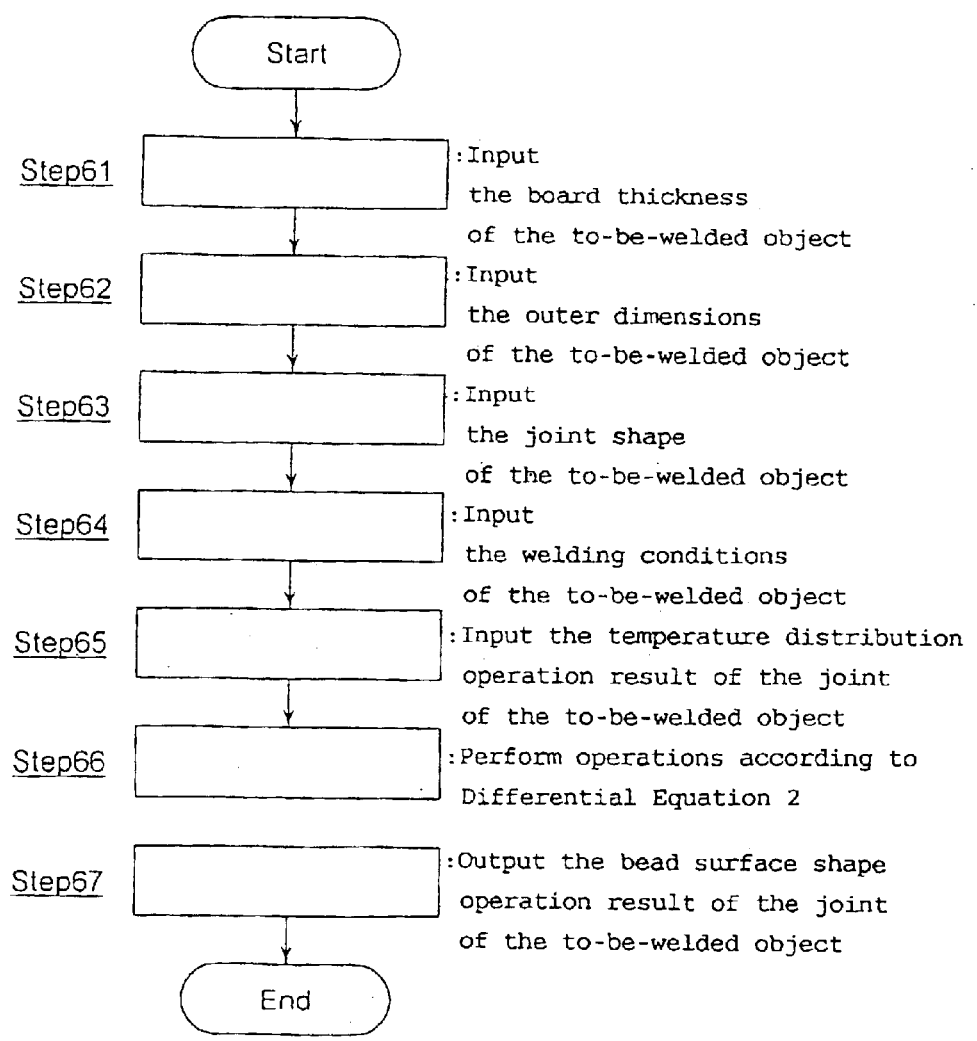
FIG. 6 is a flowchart showing one example of a bead surface shape operation means.

FIG. 6 is a flowchart showing one example of the bead surface shape operation means 24 and corresponding to the information flow of the thermal-conduction operation result display 23 and the bead surface shape display 25 of FIG. 2. One example of thermal-conduction operations will be described with reference to FIG. 6.

Step 61 The board thickness of the to-be-welded object set by the optimal welding condition operation means 21 is input.

Step 62 The outer dimensions of the to-be-welded object set by the optimal welding condition operation means 21 is input.

Step 63 The joint shape of the to-be-welded object set by the optimal welding condition operation means 21 is input.

Step 64 The welding condition of the to-be-welded object set by the optimal welding condition operation means 21 is input.

Step 65 The temperature distribution operation result of the joint of the to-be-welded object calculated by the thermal conduction operation means 22 is input.

Step 66 Operations are performed according to Differential Equation 2 based on parameters that have been input in Steps 61 to 65.

$$\sigma\left\{\frac{(1+\phi_Y^2)\phi_{XX} - 2\phi_X\phi_Y\phi_{XY} + (1+\phi_X^2)\phi_{YY}}{(1+\phi_X^2+\phi_Y^2)^{\frac{3}{2}}}\right\} = \rho g\phi - P_a - \lambda \quad \text{Equation 2}$$

$$\phi_{XX} = \frac{\partial^2 \phi}{\partial X^2}, \quad \phi_{YY} = \frac{\partial^2 \phi}{\partial Y^2}, \quad \phi_{XY} = \frac{\partial^2 \phi}{\partial X \partial Y}$$

$$\phi_X = \frac{\partial \phi}{\partial X}, \quad \phi_Y = \frac{\partial \phi}{\partial Y}$$

wherein $\phi_{xx}$, $\phi_{XY}$, $\phi_{yy}$: Second-order differential term regarding a molten weld pool surface $\phi_X$, $\phi_Y$: First-order differential term regarding a molten weld pool surface In Equation 2, each term is as follows:

ϕ: Displacement of molten weld pool surface [m]
s: Surface tension (soft steel 0.1428 [kg/m]=1.4 [N/m])
?: Density (soft steel 7.8*103 [kg/m 3])
g: Gravity (9.8 [m/sec z])
Pa: Arc pressure [Pa]
?: Lagrange's multiplier (dimensionless number)

Step 67 The bead surface shape operation result of the joint of the to-be-welded object is output, and this result is displayed by the weld penetration display means 25, and is recorded by the temperature distribution operation result recording means and the surface shape operation result recording means 26.

Figure 8:
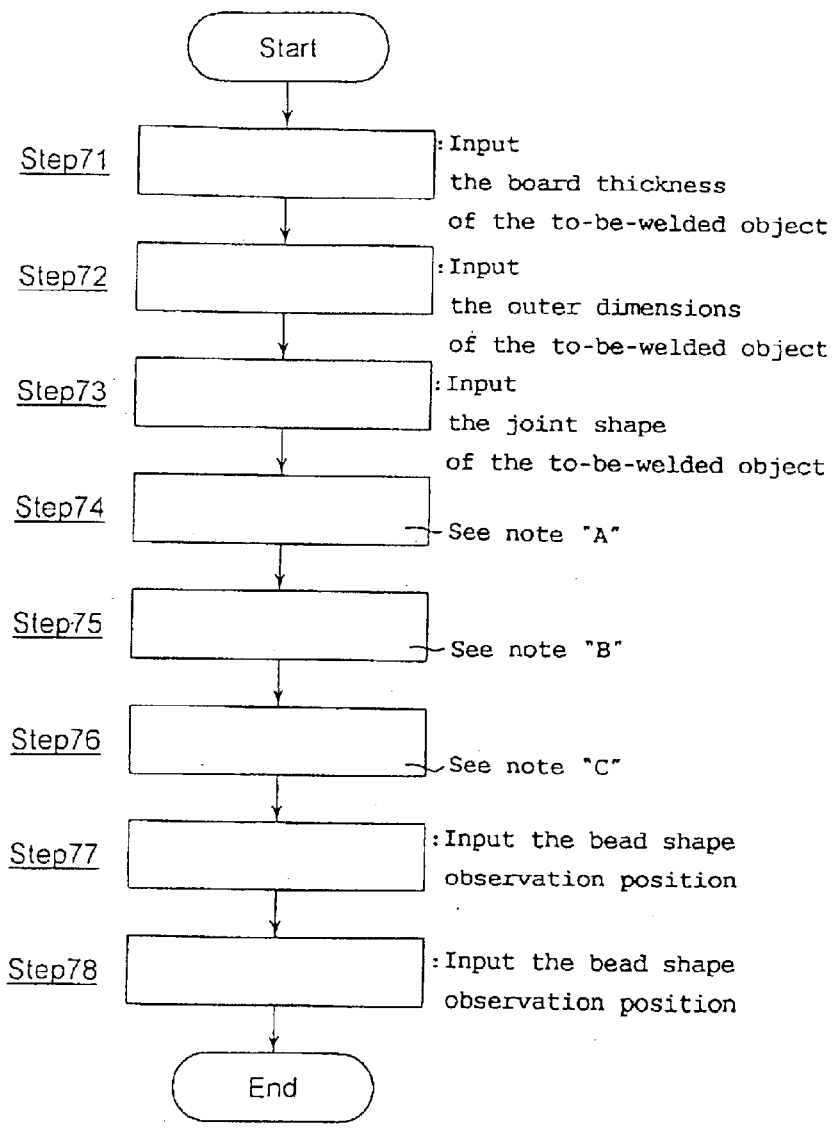
FIG. 8 is a flowchart showing one example of a bead surface shape display means.

FIG. 8 is a flowchart showing one example of the bead surface shape display means 25 and corresponding to the information flow of the optimal welding condition operation means 21 and the bead surface shape operations 24 of FIG. 2. One example of thermal conduction operations will be described with reference to FIG. 8.

Step 71 The board thickness of the to-be-welded object set by the optimal welding condition operation means 21 is input.

Step 72 The outer dimensions of the to-be-welded object set by the optimal welding condition operation means 21 is input.

Step 73 The joint shape of the to-be-welded object set by the optimal welding condition operation means 21 is input.

Step 74 The temperature distribution result of the joint of the to-be-welded object calculated by the bead shape operation means 24 is input.

Step 75 If an example of the bead shape operations exists in the past, the temperature distribution result of the joint of the to-be-welded object that is under the same condition and that has been recorded in the temperature distribution operation result recording means and in the surface shape operation result recording means 26 is input.

Step 76 The bead shape observation position set by the teaching pendant 13 which is the optimal welding condition operation means 21 is input.

Step 77 The bead surface shape is displayed at the bead shape observation position.

Figure 9:
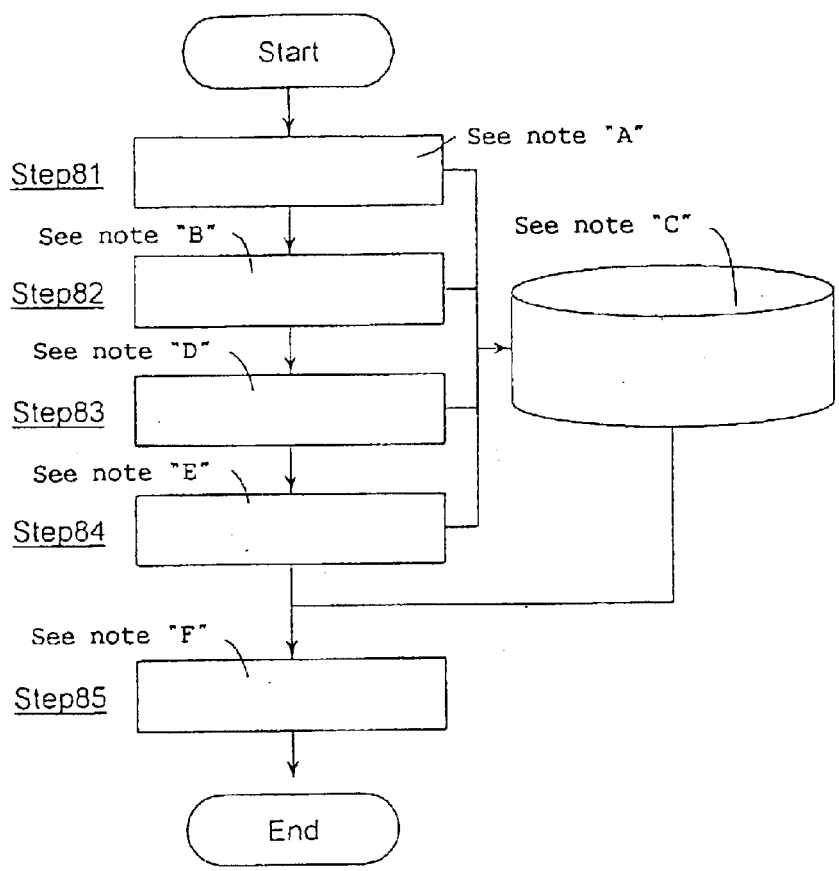
FIG. 9 is a flowchart showing one example of a temperature distribution operation result recording means and a surface shape operation result recording means.

FIG. 9 is a flowchart showing one example of the temperature distribution operation result recording means and the surface shape operation result recording means 26 and corresponding to the information flow of the optimal welding condition operation means 21, the thermal conduction operation means 22, the weld penetration display means 23, the bead surface shape operation means 24, the bead surface shape display means 25, the joint quality acceptance/rejection judging means 27, and the welding condition correction means 29 of FIG. 2. One example of the temperature distribution operation result recording means and the surface shape operation result recording means 26 will be described with reference to FIG. 9.

Step 81 Information regarding the to-be-welded object that has been output from the optimal welding condition operation means 21 is input into the temperature distribution operation result recording means and the surface shape operation result recording means 26.

Step 82 A welding condition of the to-be-welded object that has been output from the optimal welding condition operation means 21 corresponding to Step 81 is input into the temperature distribution operation result recording means and the surface shape operation result recording means 26.

Step 83 A temperature distribution operation result corresponding to Steps 81 and 82 is input into the temperature distribution operation result recording means and the surface shape operation result recording means 26.

Step 84 A bead surface shape operation result corresponding to Steps 81, 82, and 83 is input into the temperature distribution operation result recording means and the surface shape operation result recording means 26.

Step 85 Treating the to-be-welded object information of Step 81, the to-be-welded object welding condition of Step 82, the temperature distribution operation result of Step 83, and the bead surface shape operation result of Step 84 as a group of data, the data is recorded and managed by parameters of the to-be-welded object information and the to-be-welded object welding condition in the temperature distribution operation result recording means and the surface shape operation result recording means 26.

FIG. 10 is a flowchart showing one example of the joint quality acceptance/rejection judging means 27, and corresponding to an information flow with the welding condition correction means 29 of FIG. 2. One example of the joint quality acceptance/rejection judging means 27 will be described with reference to FIG. 10.

Step 91 The temperature distribution operation result and the bead surface shape operation result that have been recorded in the temperature distribution operation result recording means and the surface shape operation result recording means 26 in Step 85 are input.

Step 92 A judgment regarding the weld penetration of the joint is made according to the depth of a penetration part by the temperature distribution operation result, and, if the weld penetration is satisfactory, the stage proceeds to Step 93, and, if the weld penetration is unsatisfactory, the stage proceeds to Step 96.

Step 93 A penetration acceptance flag 00 is generated.

Step 94 According to the bead surface shape operation result, a judgment is made about the defective phenomena of penetration shortage, incomplete fusion, throat-depth shortage, undercut, overlap, excess metal shortage, and excess metal surplus. If it is judged that these phenomena have not occurred, the stage proceeds to Step 94. If it is judged that one or more of the phenomena have occurred, the stage proceeds to Step 96.

Step 95 A joint quality acceptance flag 0 is generated.

Step 96 An incomplete penetration flag 1 is generated.

Step 97 An incomplete bead shape flag 2 is generated.

Figure 11:
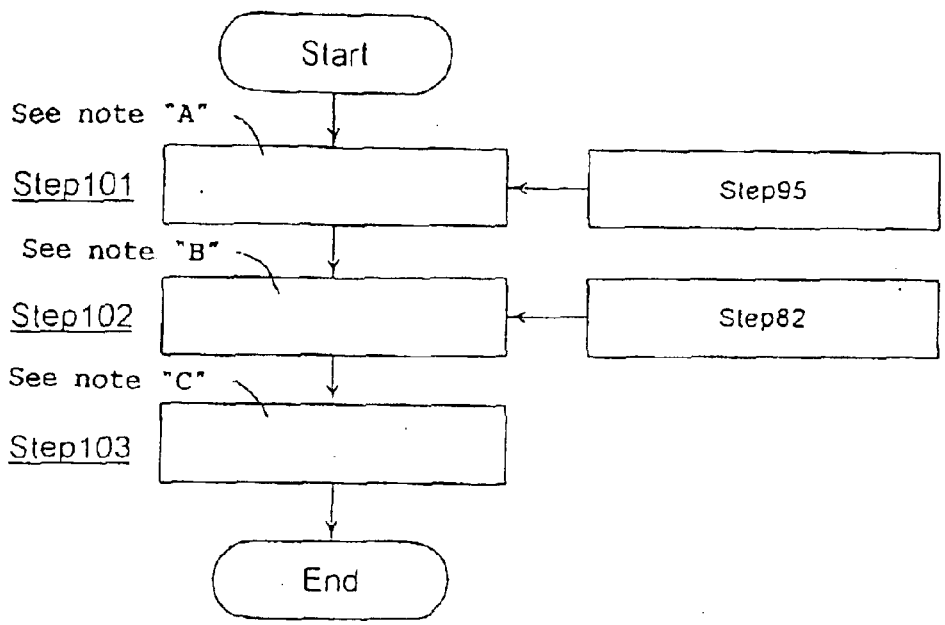
FIG. 11 is a flowchart showing one example of a weld starting means.

FIG. 11 is a flowchart showing one example of the weld starting means 28 and corresponding to an information flow with the welding condition correction means 27 of FIG. 2. One example of the weld starting means 28 will be described with reference to FIG. 11.

Step 101 The joint quality acceptance flag 0 generated in Step 95 is input.

Step 102 The welding condition of the to-be-welded object recorded in Step 82 is set.

Step 103 The welding condition set in Step 102 is set for the welder 17 of FIG. 2, and the object work 15 to be welded starts to be welded by the welding torch 14 through the robot mechanism 12.

Figure 12:
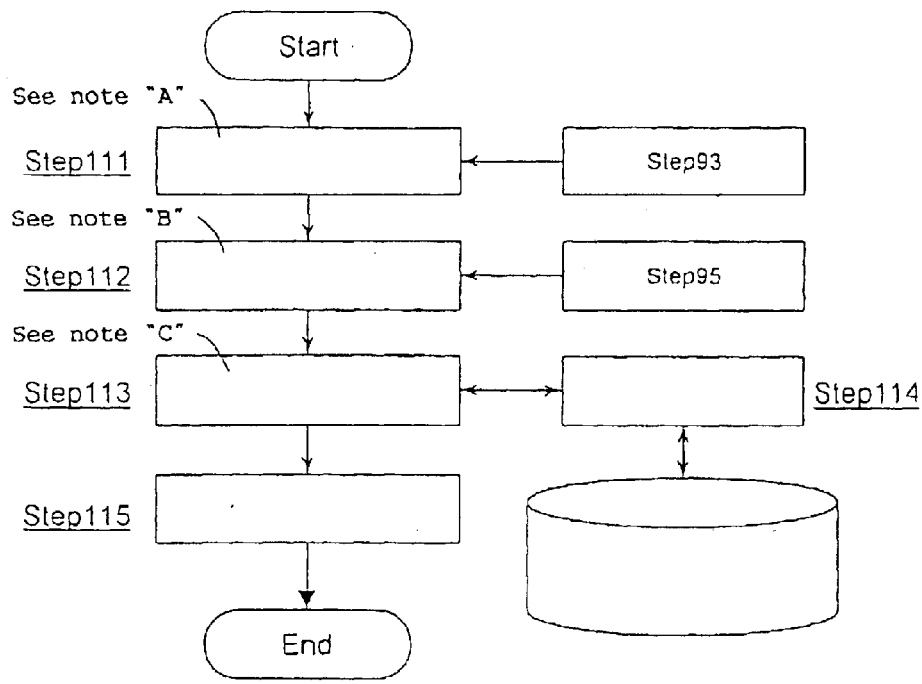
FIG. 12 is a flowchart showing one example of a welding condition correction means.

FIG. 12 corresponds to the information flow of the temperature distribution operation result recording means and the surface shape operation result recording means 26 and the joint quality acceptance/rejection judging means 27 of FIG. 2. One example of the weld starting means 29 will be described with reference to FIG. 12.

Step 111 The penetration acceptance flag 00 generated in Step 93 is input.

Step 112 The joint quality acceptance flag 0 generated in Step 95 is input.

Step 113 Board thickness, outer dimensions, and the joint shape of the to-be-welded object which are each information regarding the to-be-welded object are inquired of the temperature distribution operation result recording means and the surface shape operation result recording means 26 of FIG. 2, thereafter welding conditions that have been changed are received, and they are given to Step 115.

Step 114 Welding conditions that agree with board thickness, outer dimensions, and the joint shape of the to-be-welded object, which are each piece of information regarding the to-be-welded object and which have been inquired in Step 113, are retrieved in the temperature distribution operation result recording means and the surface shape operation result recording means 26, and welding conditions that have been retrieved are given to Step 113.

Step 115 The welding conditions given from Step 113 are given to the optimal welding condition operation means 21 of FIG. 2.

Thus, the quality of the joint of the to-be-welded object can be judged before welding without welding expertise.

Next, an embodiment for achieving the second object of the present invention will be described with reference to the figures.

Figure 13:
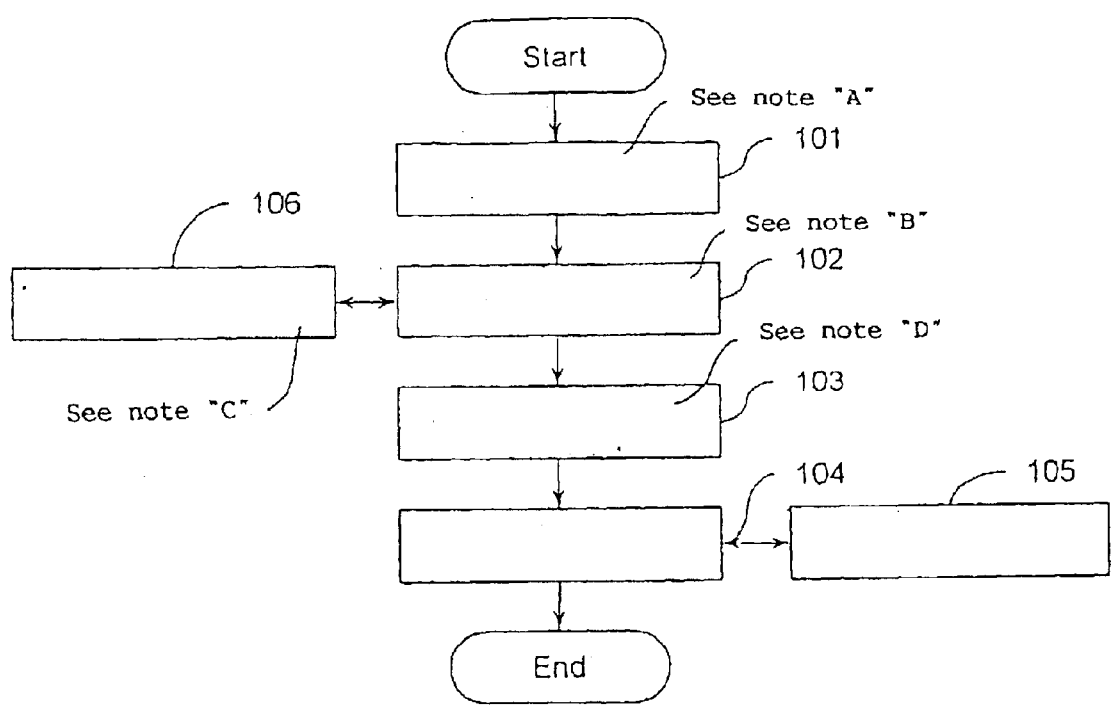
FIG. 13 is a block diagram showing an information flow in an embodiment of the present invention.

FIG. 13 is a block diagram showing an information flow of this embodiment. 101 designates a welding condition setting means for inputting or displaying information regarding the to-be-welded object and welding conditions.

102 designates a temperature distribution operation means for outputting a temperature distribution operation result based on information regarding the to-be-welded object and welding conditions that have been input from the welding condition setting means 101.

103 designates a bead shape operation means for outputting a bead shape operation result based on a temperature distribution operation result that has been output from the temperature distribution operation means 102.

104 designates a bead shape display means for displaying a bead shape based on a temperature distribution operation result output from the temperature distribution operation means 102 and based on a bead shape operation result output from the bead shape operation means 103.

105 designates a bead shape observation position setting means for changing/inputting a predetermined condition concerning the observing point of a bead shape displayed by the bead shape display means 104.

106 designates a welding-condition changing means for changing information regarding the to-be-welded object and welding conditions that have been set by the welding condition setting means 101.

Figure 14:
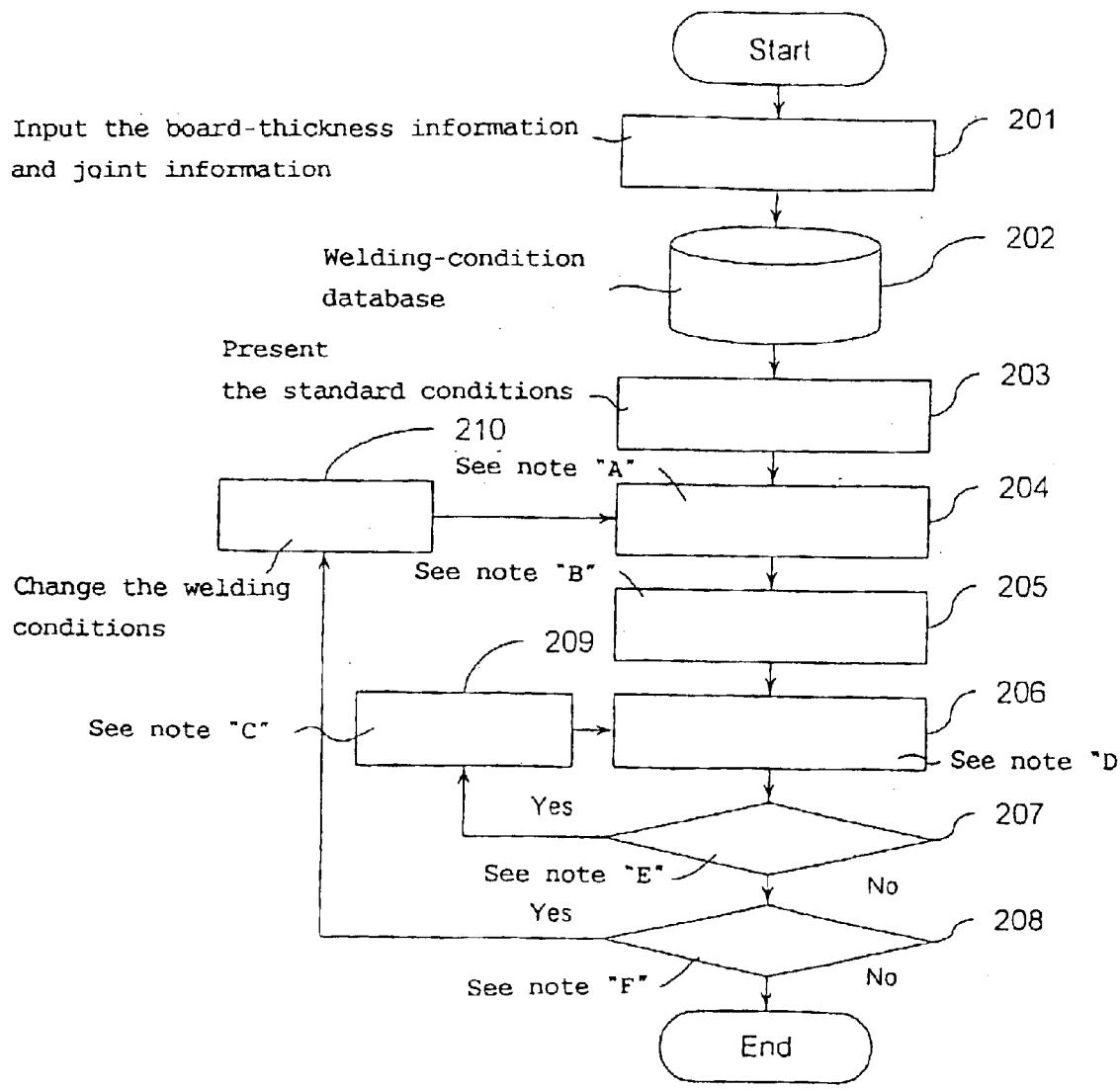
FIG. 14 is a flowchart showing a processing flow in an embodiment of the invention.

FIG. 14 is a flowchart showing this embodiment, and the input 201 of board-thickness information and joint information, a welding-condition database 202, and a standard-condition presentation 203 correspond to the information flow of the welding condition setting means 101 of FIG. 13.

201 designates board thickness information and joint information that are input by the welding condition setting means.

202 designates a welding-condition database that presents a standard welding condition in accordance with a board thickness and a joint shape based on the board thickness information and the joint information of the to-be-welded object that has been input by 201.

The standard-condition presentation 203 is a welding condition presented by the welding-condition database 202.

A thermal conduction operation means 204 corresponds to the information flow of the temperature distribution operation means 102 of FIG. 13 and performs thermal-conduction operations according to the welding condition 203 that has been presented.

A bead shape operation means 205 corresponds to the information flow of the bead surface shape operation means 103 of FIG. 13 and outputs a bead shape operation result based on a temperature distribution operation result output from the thermal conduction operation means 204.

A display means 206 of a bead shape operation result corresponds to the information flow of the bead shape display means 104 of FIG. 13 and outputs penetration into a base material and a bead surface to an operation-result display based on operation results of the thermal conduction operation means 204 and the bead shape operation means 205.

A judgment 207 regarding a display position change and a display position setting change means 209 correspond to the information flow of the bead shape observation position setting means 105 of FIG. 13.

The display position setting change means 209 performs enlargement/reduction, up/down/left/right/front/back, and rotational change of the display position of an operation result in real time.

The judgment 207 regarding a display position change and the display position setting change 209 correspond to the information flow of the welding-condition changing means 106 of FIG. 13.

208 designates a judgment regarding a welding condition setting change.

210 designates a welding-condition changing means for changing welding current, welding voltage, welding speed, and torch angle which are welding conditions and for again performing arithmetical operations by the bead shape operation means 205.

Figure 15:
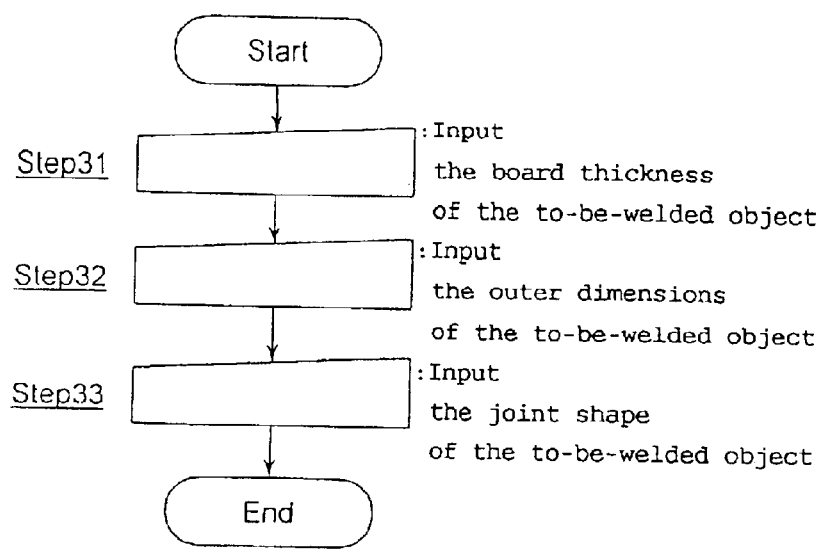
FIG. 15 is a flowchart showing one example of an input means of board-thickness/joint information.

FIG. 15 is a flowchart showing one example of the setting of board-thickness information and joint information that are input by the welding condition setting means and corresponding to the information flow of the input 201 of the board-thickness information and the joint information of FIG. 14.

Step 31 An operator is required to select or input the board thickness of the to-be-welded object from the welding condition setting means and to set it.

Step 32 The operator is required to select or input the outer dimensions of the to-be-welded object from the welding condition setting means and to set it.

Step 33 The operator is required to select or input the joint shape of the to-be-welded object from the welding condition setting means and to set it.

Figure 16:
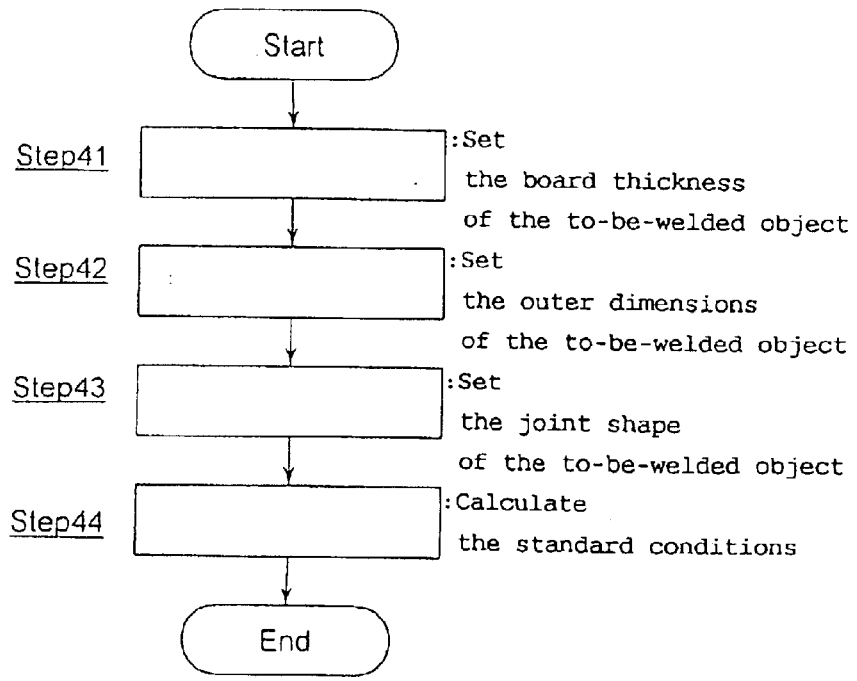
FIG. 16 is a flowchart showing one example of a welding-condition database.

FIG. 16 is a flowchart showing one example of the welding-condition database 202 and corresponding to the information flow of the welding-condition database 202 of FIG. 14.

Step 41 The board thickness of the to-be-welded object set by the input 201 of the board thickness information and the joint information of FIG. 14 is input.

Step 42 The outer dimensions of the to-be-welded object set by the input 201 of the board thickness information and the joint information of FIG. 14 is input.

Step 43 The joint shape of the to-be-welded object set by the input 201 of the board thickness information and the joint information of FIG. 14 is input.

Figure 25:
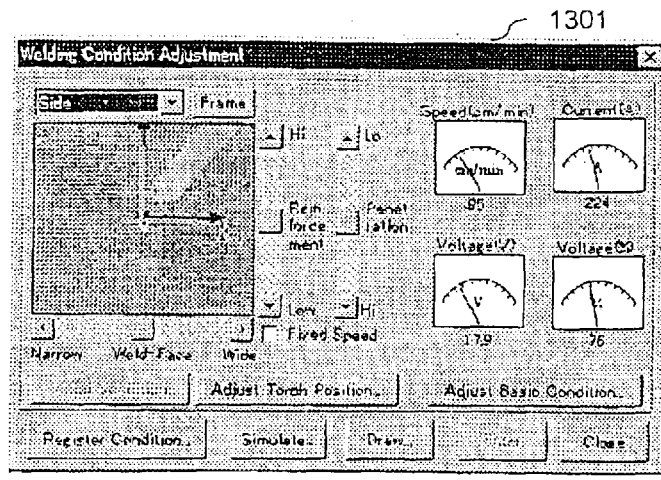
FIG. 25 shows one example of a standard-condition presentation.

Step 44 Based on the board thickness of the to-be-welded object set in Step 41, the outer dimensions of the to-be-welded object set in Step 42, and the joint shape of the to-be-welded object set in Step 43, the welding current, the welding voltage, and the welding speed which are standard welding conditions concerning the to-be-welded object stored in the database are calculated. FIG. 25 shows a standard-condition presenting screen 1301.

Figure 17:
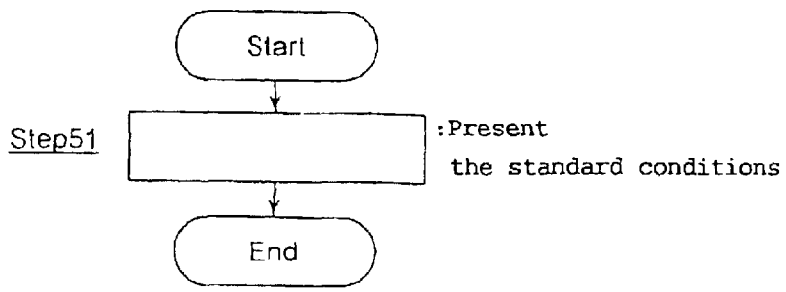
FIG. 17 is a flowchart showing one example of a standard-condition presentation.

FIG. 17 is a flowchart showing one example of the presentation 203 of standard conditions and corresponding to the information flow of the standard-condition presentation 203 of FIG. 14. One example of the standard-condition presentation will be described.

Step 51 Welding current, welding voltage, and welding speed which are standard conditions calculated in Step 44 are presented.

Figure 18:
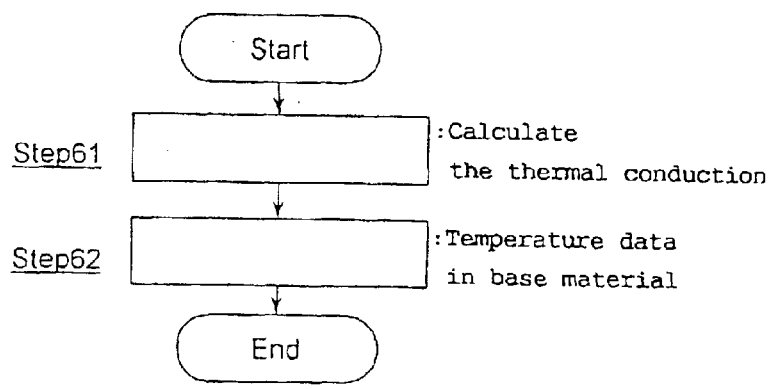
FIG. 18 is a flowchart showing one example of thermal-conduction operations.

FIG. 18 is a flowchart showing one example of the thermal-conduction operations 204 and corresponding to the information flow of the standard-condition presentation 204 of FIG. 14. One example of the thermal-conduction operations will be described.

Step 61 Based on parameters that have been calculated and input in Step 54, iterative operations are performed according to Differential Equation 1 mentioned above.

Step 62 A temperature distribution operation result of the to-be-welded object is output, and the output result is used by the bead shape operation means 205 and is displayed by the display 206 of the bead shape operation result.

Figure 26:
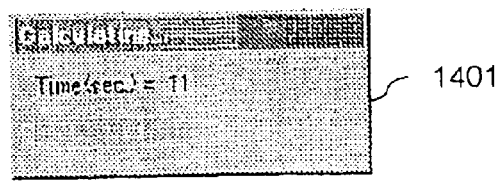
FIG. 26 shows a situation in one example that represents an arithmetical development by a bar graph and represents elapsed time by numerical values.

FIG. 26 shows one example of a development/time display screen 1401 in which an arithmetical development is represented by a bar graph and elapsed time is represented by numerical values.

Figure 19:
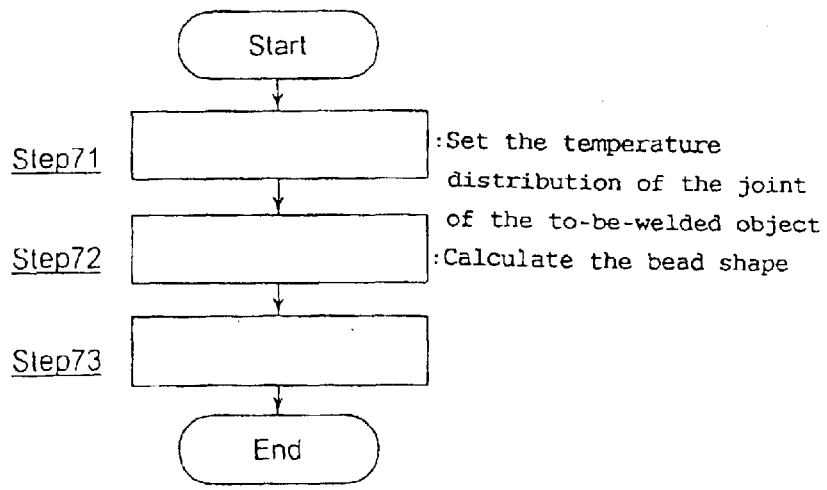
FIG. 19 is a flowchart showing one example of bead shape operations.

FIG. 19 is a flowchart showing one example of the bead shape operations 205. This corresponds to the information flow of the bead shape operations 205 of FIG. 14.

Step 71 The temperature distribution of the joint of the to-be-welded object is set based on temperature data calculated in Step 52 of the thermal conduction operation means 204.

Step 72 Based on the parameters input in Step 61, the bead surface shape operations are performed according to Differential Equation 2 mentioned above.

Step 73 A bead surface shape operation result of the joint of the to-be-welded object is output.

Figure 20:
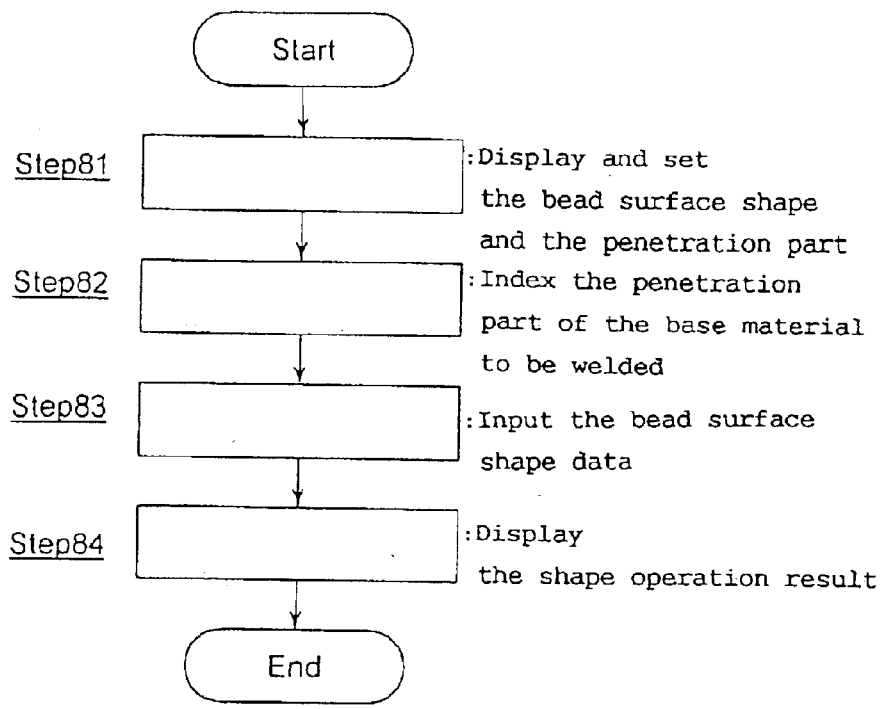
FIG. 20 is a flowchart showing one example of the display of a bead shape operation result.

FIG. 20 is a flowchart showing one example of the display 206 of the bead shape operation result and corresponding to the information flow of the display 206 of the bead shape operation result of FIG. 14.

Step 81 A bead surface shape, a display position which is a predetermined display value of a penetration part, a display angle, and a display magnification are input.

Step 82 A fusion part in a base material of the to-be-welded object that has been set by the indexing of the penetration part of the base material thereof is set and input.

Step 83 Bead surface shape data calculated by the bead shape operations 205 is input.

Figure 27:
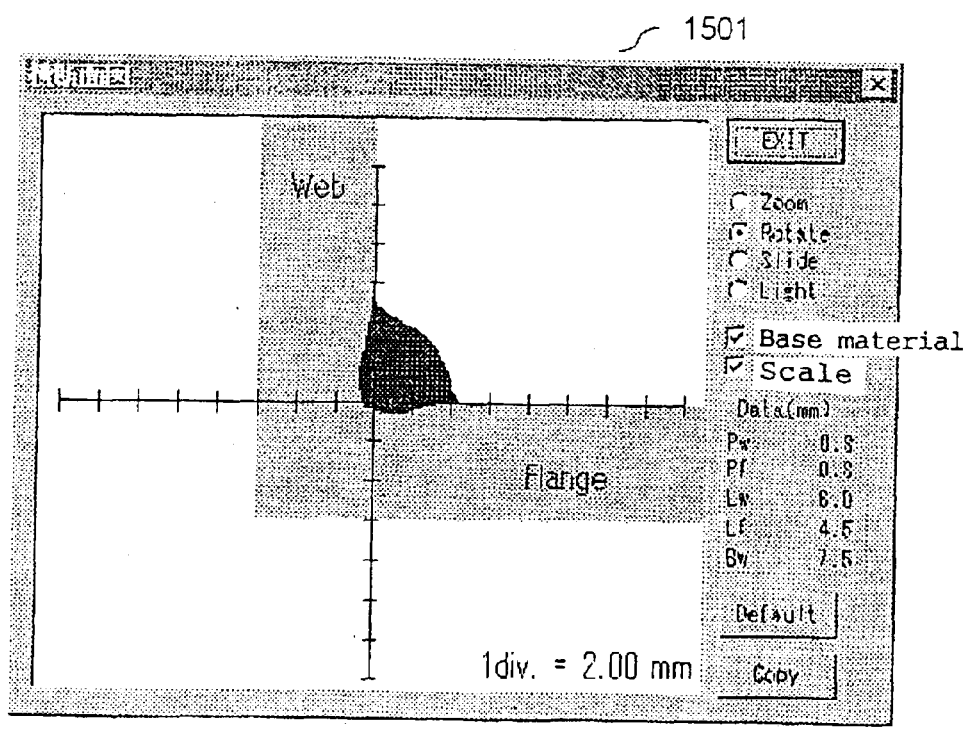
FIG. 27 shows a situation in one example of an operation result.

Step 84 The shape operation result is displayed in the form of a longitudinal sectional view, a cross-sectional view, and a surface bird's-eye view. FIG. 27 shows one example of a display screen 1501 of the shape operation result.

Figure 21:
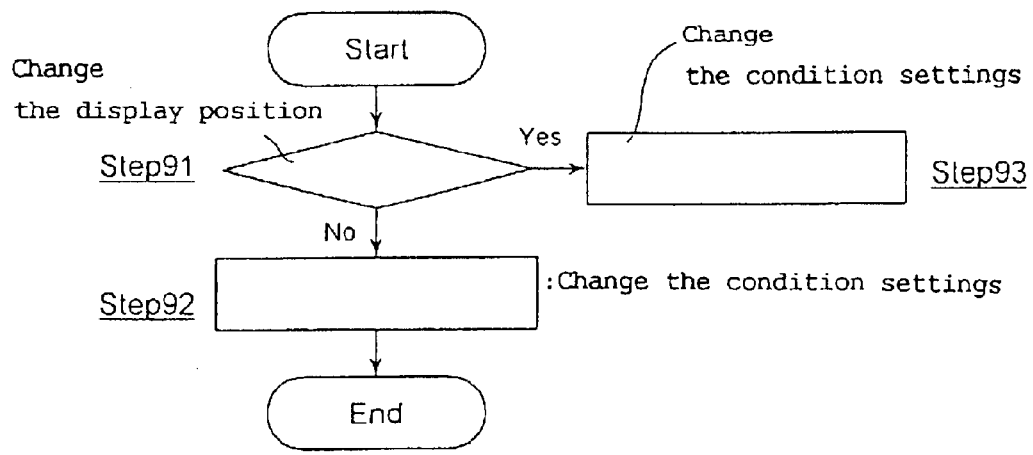
FIG. 21 is a flowchart showing one example of a display position change.

FIG. 21 is a flowchart showing one example of the display position change 207 and corresponding to the information flow of the display position 207 of FIG. 14.

Step 91 The operator judges a change in the display setting of the shape operation result of Step 84.

Step 92 To the welding condition setting change of Step 101.

Step 93 To the display setting change 209 of FIG. 14.

Figure 22:
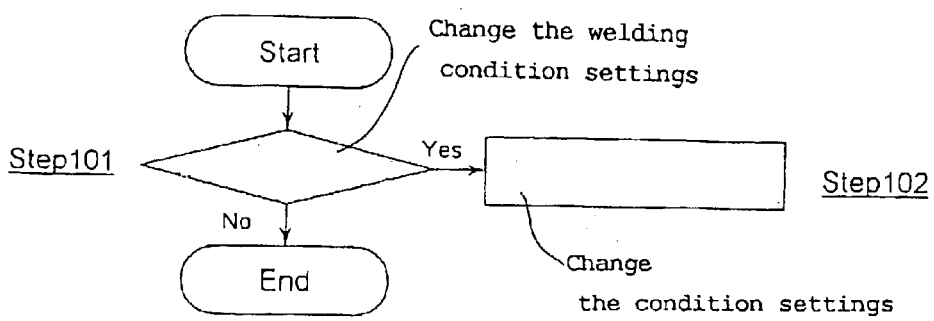
FIG. 22 is a flowchart showing one example of a condition setting change.

FIG. 22 is a flowchart showing one example of the condition setting change 208 and corresponding to the information flow of the display position 208 of FIG. 14.

Step 101 The operator judges a change in the welding condition of the shape operation result of Step 84.

Step 102 To the welding condition change 210 of FIG. 14.

Figure 23:
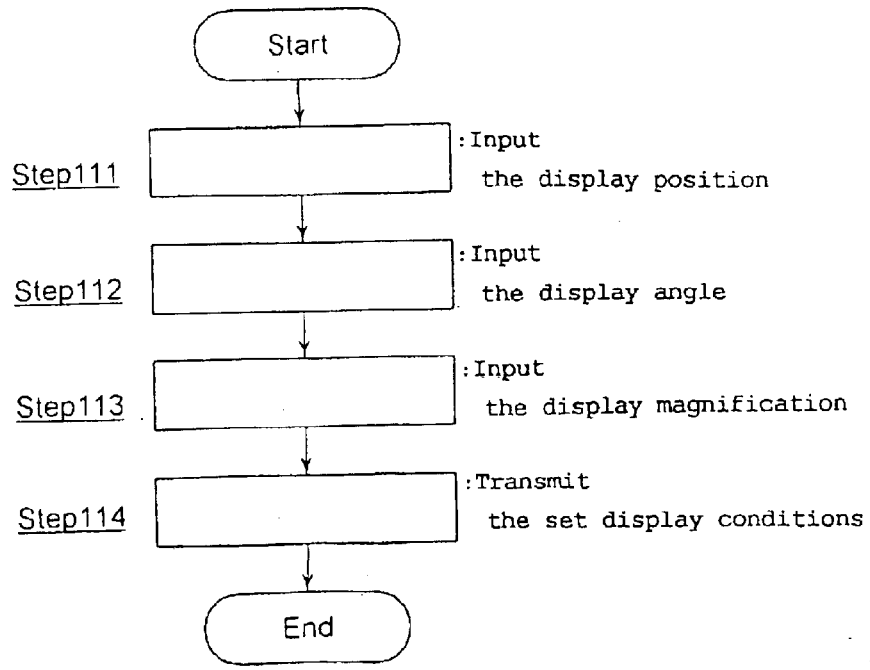
FIG. 23 is a flowchart showing one example of a display position setting change.

FIG. 23 is a flowchart showing one example of the display setting change 209 and corresponding to the information flow of the display position 209 of FIG. 14.

Step 111 A bead surface shape and a display position which is a display setting value of a penetration part are input.

Step 112 A bead surface shape and a display angle which is a display setting value of a penetration part are input.

Step 113 A bead surface shape and a display magnification which is a display setting value of a penetration part are input.

Figure 28:
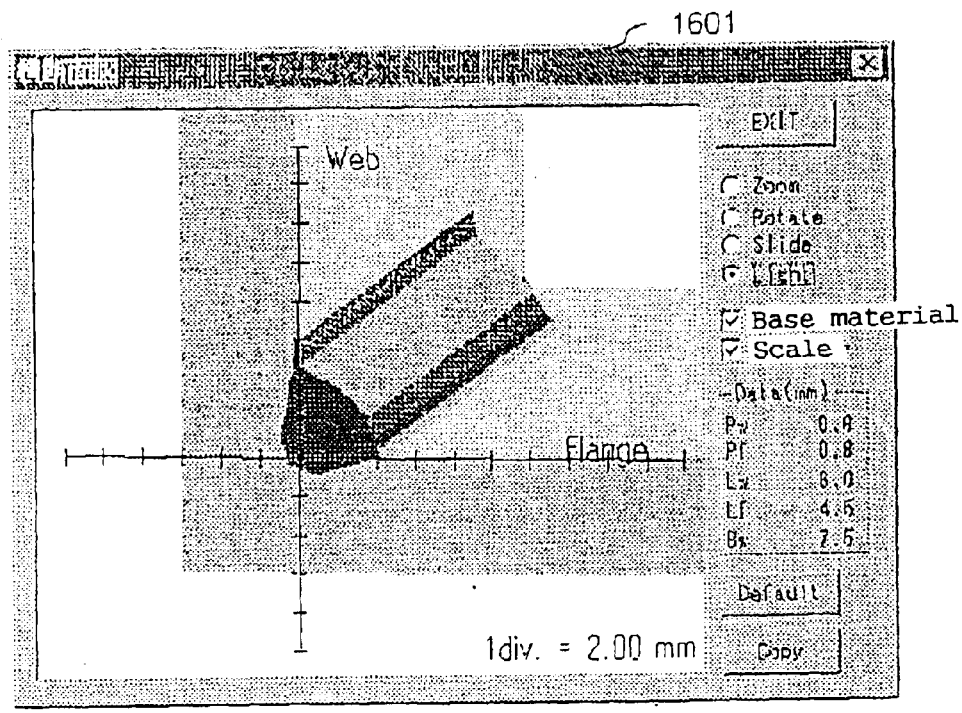
FIG. 28 shows one example of an input screen of a display setting change.

Step 114 The display setting conditions that have been input in Steps 111 to 113 are transmitted to the display 116 of the bead shape operation result of FIG. 14. FIG. 28 shows one example of an input screen 1601 of the display setting change.

Figure 24:
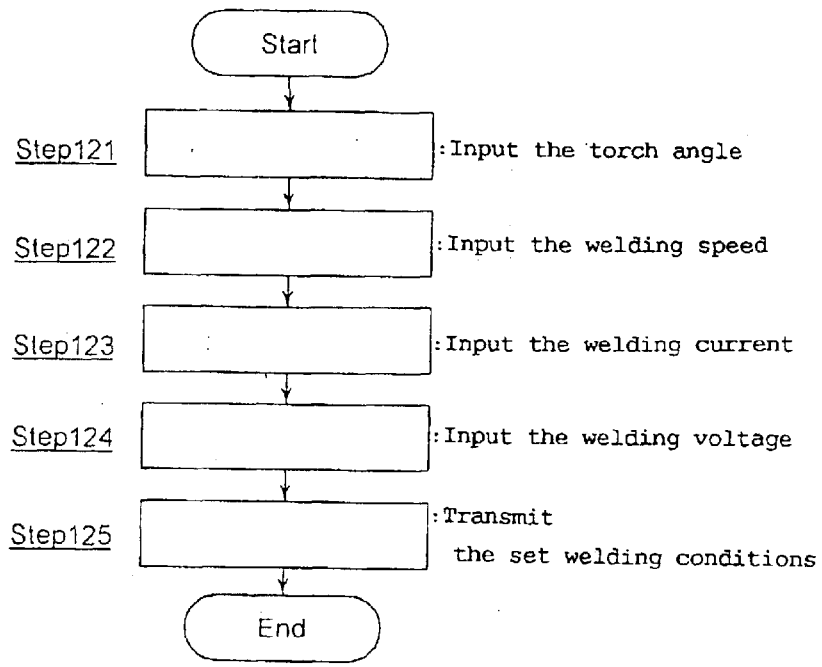
FIG. 24 is a flowchart showing one example of a welding condition setting change.

FIG. 24 is a flowchart showing one example of the welding condition setting change 210 and corresponding to the information flow of the display position 210 of FIG. 14.

Step 121 A torch angle, which is a welding condition setting value, is input.

Step 122 A welding speed, which is a welding condition setting value, is input.

Step 123 A welding current, which is a welding condition setting value, is input.

Step 124 A welding voltage, which is a welding condition setting value, is input.

Figure 29:
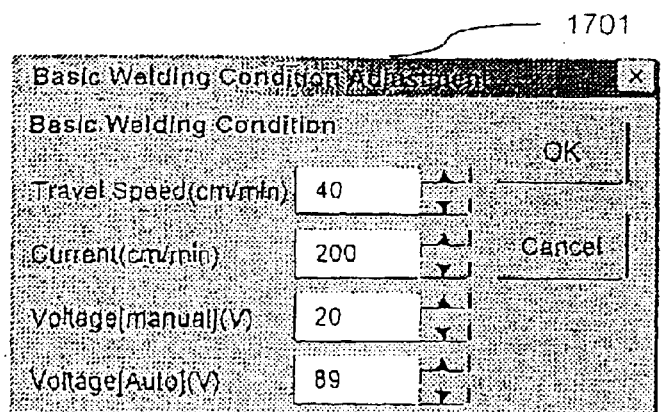
FIG. 29 shows one example of an input screen of a welding condition change.

Step 125 The welding conditions input in Steps 121 to 124 are transmitted to the thermal-conduction operations 204 of FIG. 14. FIG. 29 shows one example of an input screen 1701 of the welding condition change.

As described above, according to the first solution means of the present invention, the quality of the joint of the to-be-welded object can be judged before welding without welding expertise. Additionally, the quality of the joint can be confirmed at any time, and the actual object of the to-be-welded object becomes unnecessary, and therefore man-hours spent in quality verification can be reduced, and the cost of sample materials for quality verification can be reduced.

According to the second means of the present invention, a standard welding condition and a predicted cross-sectional shape of the welded joint are presented by specifying the board thickness and joint shape of the to-be-welded object without welding expertise, and a beginning welder newly changes a torch angle condition and the like, and, as a result, the worker can confirm the predicted cross-sectional shape of a welded joint that depends on welding conditions any number of times, and training equal to an offer of skills from a skilled welder can be realized by the welding skill training device.

INDUSTRIAL APPLICABILITY

The present invention is useful as a fully-automatic welding device and a welding skill training device.

What is claimed is:

1. An automatic welding device having an optimal welding condition operation means for setting information regarding a to-be-welded object that includes board thickness, outer dimensions, and joint shape of the to-be-welded object and for performing arithmetical operations on welding conditions that include welding current, welding voltage, and welding speed suitable for the information, comprising:

temperature distribution operation means for performing arithmetical operations on a temperature distribution in a joint of the to-be-welded object from the information regarding the to-be-welded object and from the welding conditions;

temperature distribution operation result recording means for recording at least the information regarding the to-be-welded object, the welding conditions, and a temperature distribution operation result calculated by the temperature distribution operation means;

weld penetration display means for displaying at least a penetration width, a penetration depth, and a penetration shape based on the temperature distribution operation result;

bead surface shape operation means for performing arithmetical operations on a molten-metal bead surface shape from at least the information regarding the to-be-welded object, the welding conditions, and the temperature distribution operation result that have been recorded in the temperature distribution operation result recording means;

bead surface shape operation result recording means for recording a molten-metal bead surface shape operation result calculated by the bead surface shape operation means;

bead surface shape operation result display means for displaying the surface shape operation result calculated by the bead surface shape operation means in the form of at least a cross-sectional view, a longitudinal sectional view, and a general view of a welded joint;

bead shape observation position setting means capable of setting a bead shape observation position by a viewing point from an arbitrary position in displaying the bead surface shape;

arbitrary position bead shape display means for displaying at least the general view of the welded joint from a position set by the bead shape observation position setting means;

joint quality acceptance/rejection judging means for judging acceptance or rejection of a joint quality of the to-be-welded object from a temperature distribution in the joint of the to-be-welded object in the temperature distribution operation result recording means;

weld starting means for automatically starting to weld the to-be-welded object under the welding conditions recorded in the temperature distribution operation result recording means when the joint quality acceptance/rejection judging means judges the joint quality to be acceptable;

welding condition correction means for correcting the welding conditions of at least the welding current, the welding voltage, and the welding speed so as to satisfy acceptance criteria when the joint quality acceptance/rejection judging means judges the joint quality to be rejectable;

operation result record situation judging means for judging the presence or absence of similar information regarding the to-be-welded object, a similar temperature distribution operation result record, and a similar bead surface shape operation result record before setting information regarding the to-be-welded object; and operation time omitting means for omitting time required for operation by the temperature distribution operation means and time required for operation by the bead surface shape operation means by allowing the weld penetration display means to display a temperature distribution operation result record in the joint of the to-be-welded object and by allowing the bead surface shape display means to display a bead surface shape operation result record when the operation result record situation judging means judges that there is an arithmetical operation record in the past.

2. The automatic welding device according to claim 1 wherein the temperature distribution operation means sets the information regarding the to-be-welded object that includes board thickness, outer dimensions, and joint shape of the to-be-welded object by the optimal welding condition operation means, and, based on welding conditions suitable for information regarding the to-be-welded object, a temperature distribution in the joint of the to-be-welded object and on a surface thereof is calculated according to a differentiated formula of a heat-conduction equation.

3. The automatic welding device according to claim 2 wherein the temperature distribution operation result recording means records the welding conditions suitable for information regarding the to-be-welded object by use of one or more recorders of at least a magnetic medium device, a photo-magnetic medium device, and an electronic medium device.

4. The automatic welding device according to claim 2 wherein the weld penetration display means displays a more detailed temperature distribution than the temperature distribution of the to-be-welded object is displayed, by information regarding the to-be-welded object that has been set by the optimum welding condition input device, and by a physical constant of the to-be-welded object that has been set by the optimum welding condition input devise while paying attention to the penetration width and penetration shape.

5. The automatic welding device according to claim 2 wherein the bead surface shape operation means calculates a molten-metal bead surface shape, by information regarding the to-be-welded object that has been set by the optimum welding condition input device, and by a physical constant of the to-be-welded object that has been set by the optimum welding condition input device according to a curved surface equation and an optimization method.

6. The automatic welding device according to claim 5 characterized in that the optimization method in the bead surface shape operation means is to solve the curved surface equation according to one or more of a golden section method which is a one-variable search method, a Fibonacci search method, and a quadratic interpolation method inside arithmetical operations when a solution is calculated in operations on the bead surface shape.

7. The automatic welding device according to claim 5 wherein the bead surface shape operation result recording means records welding conditions suitable for information regarding the to-be-welded object by the use of one or more recorders of at least a magnetic medium device, a photo-magnetic medium device, and an electronic medium device.

8. The automatic welding device according to claim 5 wherein the bead surface shape operation result display means displays at least a cross-sectional view, a longitudinal sectional view, and a three-dimensional general view and by information regarding the to-be-welded object set by the optimum welding condition input device.

9. The automatic welding device according to claim 8 wherein the arbitrary position bead shape display means enables an operator to observe the three-dimensional general view from an arbitrary viewing point at least by information regarding the to-be-welded object and by the viewing-point information set by the bead shape observation position setting means.

10. The automatic welding device according to claim 1 wherein the bead shape observation position setting means determines a viewing-point setting position for observing the bead surface shape according to viewing-point information that has been set by the optimum welding condition input device.

11. The automatic welding device according to claim 1 wherein the joint quality acceptance/rejection judging means judges whether the joint quality of the to-be-welded object is acceptable or rejectable by estimating at least one of the phenomena of penetration shortage, imperfect fusion, throat-depth shortage, undercut, overlap, excess metal shortage, and excess metal surplus at least based on information regarding the to-be-welded object set by the welding condition input device and based on the bead surface shape operation result.

12. The automatic welding device according to claim 1 wherein the weld starting means starts welding by use of the welding conditions of at least the welding current, the welding voltage and the welding speed that have been recorded in the temperature distribution calculation result recording means.

13. The automatic welding device according to claim 1 wherein the operation result record situation judging means retrieves/judges the presence or absence of similar information regarding the to-be-welded object in a record of the temperature distribution operation result and in a record of the bead surface shape operation result when information regarding the to-be-welded object is set.

14. The automatic welding device according to claim 1 wherein the welding condition correction means transforms rejected welding conditions into acceptable conditions, and displays corrected welding conditions by use of data that has been recorded in the temperature distribution calculation result recording means and by use of conditions that have been set from the welding condition input device in the joint quality acceptance/rejection judging means.

15. The automatic welding device according to claim 1 wherein a temperature distribution in the joint of the to-bewelded object recorded in the temperature distribution operation result recording means is displayed by the weld penetration display means, and a molten-metal bead surface shape recorded in the bead surface shape operation result recording means is displayed by the bead surface shape operation result display means, and thereby the operation time omitting means omits each arithmetical operation and shortens/omits time needed until a display image appears if there is an example that agrees with information regarding the to-be-welded object and the welding conditions in the temperature distribution operation result recording means and in the bead surface shape operation result recording means when information regarding the to-be-welded object and the welding conditions are set from the welding condition input device.

16. A welding skill training device having a welding condition setting means for setting information regarding a to-be-welded object that includes board thickness, outer dimensions, and joint shape of the to-be-welded object and presenting welding conditions that include welding current, welding voltage, welding speed, and torch angle suitable for the information, comprising:

temperature distribution operation means for performing arithmetical operations for a temperature distribution in a joint of the to-be-welded object from information regarding the to-be-welded object and from the welding conditions;

bead surface shape operation means for performing arithmetical operations on a molten-metal bead surface shape from information regarding the to-be-welded object, from the welding conditions, and from the temperature distribution operation result;

bead shape display means for displaying a welded-joint bead shape by a cross-sectional view, a longitudinal sectional view, and a general view from a surface shape operation result calculated by the surface shape operation means and a temperature distribution calculated by the temperature distribution operation means;

bead shape observation position setting means capable of setting a bead shape observation position by a viewing point from an arbitrary position in displaying the bead shape; and welding-condition changing means for changing at least a penetration width, a penetration depth, and a penetration shape based on the temperature distribution operation result.

17. The welding skill training device according to claim 16 wherein the temperature distribution operation means sets information regarding the to-be-welded object that includes at least board thickness, outer dimensions, and joint shape of the to-be-welded object by the welding condition setting means, and, based on welding conditions suitable for information regarding the to-be-welded object, a temperature distribution in the joint of the to-be-welded object and on a surface thereof is calculated according to a differentiated formula of a heat-conduction equation.

18. The welding skill training device according to claim 17 wherein the bead surface shape operation means calculates a molten-metal bead surface shape at least by an operation result of a temperature distribution, by information regarding the to-be-welded object that has been set by the welding condition setting means, and by a physical constant of the to-be-welded object that has been set by the welding condition setting means according to a curved surface equation.

19. The welding skill training device according to claim 18 wherein the bead shape display means displays at least a cross-sectional view, a longitudinal sectional view, and a three-dimensional general view and by the board-thickness/ joint information regarding the to-be-welded object set by the welding condition setting means.

20. The welding skill training device according to claim 17 wherein the welding-condition changing means changes at least the torch angle, the welding current, the welding voltage, and the welding speed which are welding conditions of the to-be-welded object, and thereby enables an operator to perform a re-calculation of the temperature distribution.

21. The welding skill training device according to claim 16 wherein the bead shape observation position setting means determines a viewing-point setting position for observing the bead surface shape according to viewing-point information set by the welding condition setting means.

\* \* \* \* \*